Nov. 6, 1934.  M. MOONEY  1,979,398
SPEED REGULATOR AND THE LIKE
Filed May 20, 1927   2 Sheets-Sheet 1
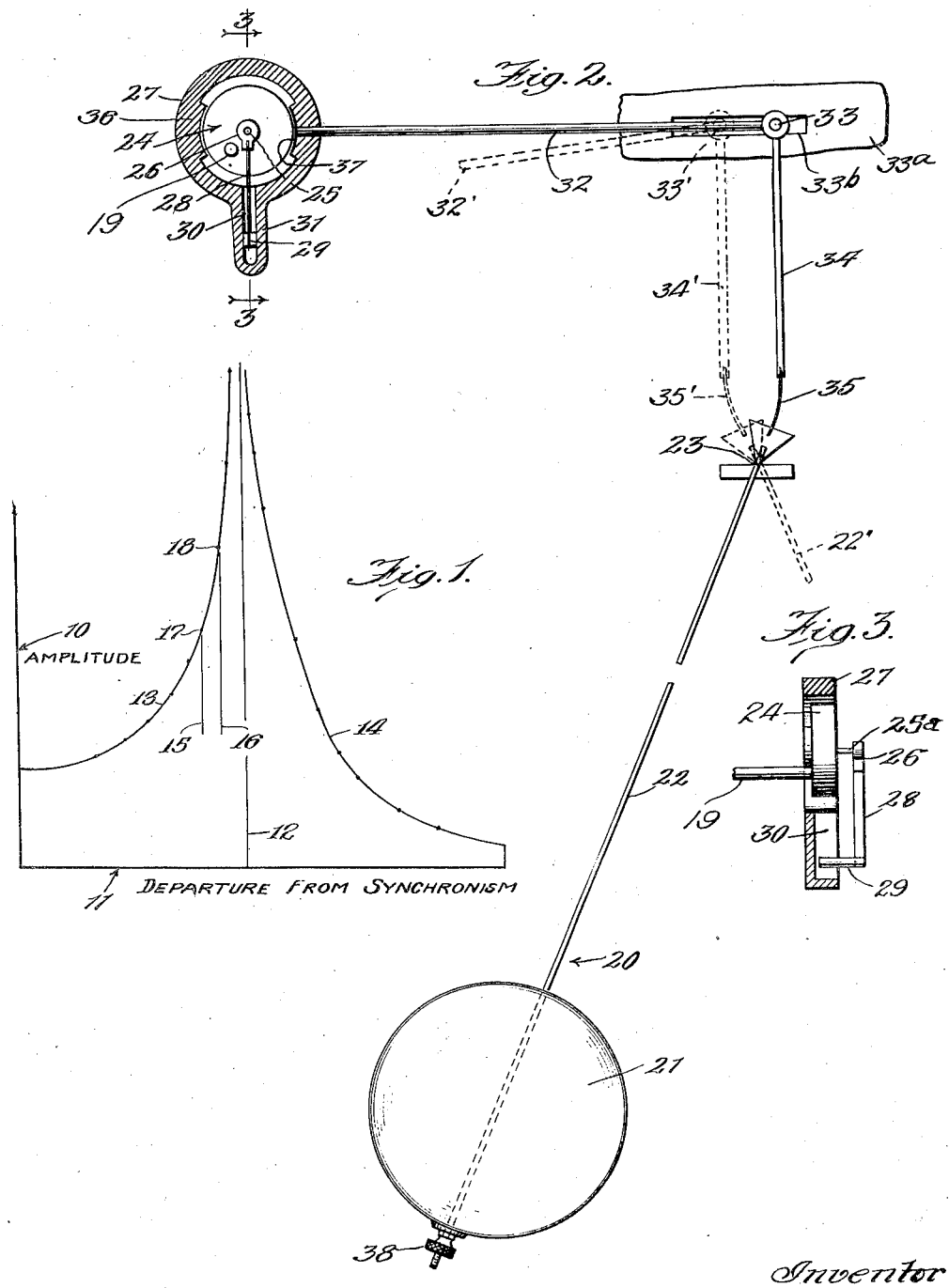

Nov. 6, 1934.    M. MOONEY    1,979,398
SPEED REGULATOR AND THE LIKE
Filed May 20, 1927    2 Sheets-Sheet 2

Inventor:
Melvin Mooney
By Thos. A. Banning Jr.
atty.

Patented Nov. 6, 1934

1,979,398

UNITED STATES PATENT OFFICE 1,979,398

SPEED REGULATOR AND THE LIKE

Melvin Mooney, Chicago, Ill.

Application May 20, 1927, Serial No. 193,000

9 Claims. (Cl. 188—180)

The present invention has to do with certain improvements in speed regulators and the like. The features of the invention may be usefully applied for the regulation of the speeds of many different kinds of devices, such as clocks and other time pieces of different kinds, rotating shafts, the speed of which must be accurately controlled, and numerous other applications which will occur to the person considering the invention.

The main object of the invention is to provide an arrangement such that a very accurate and reliable regulation of speed will be insured. In fact, the invention herein disclosed is such that the effect of a very slight departure from the desired speed will result in a very greatly amplified control force tending to restore the speed to the rate which it is desired to maintain.

Another feature of the invention relates to the provision of means whereby a controlling force of sufficient amount may be produced to take care of the needs of controlling the speed of machines where relatively large powers are being handled.

Numerous other applications of the invention will be readily apparent to any one skilled in the art to which the same appertains.

In order that the principles herein disclosed may be better understood and their application may be better appreciated, I will first explain briefly the principles involved and will then refer to the drawings, wherein certain applications of those principles are set forth.

The action of any centripetal governor is not as precise as that of an oscillating governor, but the latter type has heretofore been applied only for the governing of intermittent motions. For example, the balance wheel of a watch or clock is an oscillatory governor and is very precise in its action, but it serves to govern an intermittent motion and is thus definitely distinguished from the governing of a continuously rotating motion.

The present invention has to do with improvements whereby the oscillatory governing system is driven by a continuously rotating machine or element whose velocity is governed by the frequency of the oscillating machine. In other words the driving element is a continuously rotating member and is governed by an oscillating governor, being thus clearly distinguished from previous arrangements in which the driving member or element moves intermittently with the oscillations of the oscillating governor.

The continuously moving member may be controlled by the oscillating member either by means of friction or any other suitable system of control, either mechanical or electrical; and the control may be applied either in the case of a rotating member, the speed of which tends to increase, or in the case of a rotating member the speed of which tends to decrease.

In the drawings hereinafter referred to and described I have illustrated several applications of the principles of my invention, including both mechanical and electrical control systems I have also illustrated said principles as they may be used in the case of an oscillating pendulum, in the case of an oscillating balance wheel, and as they may be used in the case of a tuned electric circuit. In order that certain of these embodiments may be better understood, the following explanation of the movements of an oscillating body subject to the application of extraneous power, are given by way of illustration.

Any periodically moving body, such as a pendulum or balance wheel, which moves back and forth periodically through a certain cycle, has a certain natural period dependent upon those factors which affect said period, and where said body is swinging or oscillating without extraneous control, said period will be very closely approximated, depending upon the amount of external resistance encountered, such as friction, windage, etc. In fact, in the absence of any mechanical friction or windage, or other modifying influence, the natural period of the body will be absolutely attained and maintained. The amplitude of oscillation will depend upon numerous factors, and in the practical case of a body such as a pendulum or balance wheel the resistance and windage or other restraining influence will result in a wastage of energy, so that the amplitude will decrease from swing to swing until finally a condition of rest is approximated. Similar factors also affect any oscillating body of energy such as the energy of an oscillating electrical circuit.

The continued oscillation of such a body depends upon the continued application of work from an external source; and the amount of such external work which can be taken into the oscillating body during each period of swing will necessarily depend upon the relationship of the time of application of said external force to the oscillating body itself, taking account also of the amount of departure of the external force from a condition of synchronism with the oscillations of the body. In other words, if the impulses of external force depart from a condition of synchronism with the natural period of the oscillating body the latter will absorb a lesser amount of energy at each stroke than could be absorbed in a case of perfect synchronism; and therefore the amplitude of swing of the oscillating body will be less than what it would be in the case where the applied impulses of external power are synchronous with the natural period of the body. This is because the increase in amplitude of swing is dependent upon the absorption of more energy from the external source than is necessary to overcome frictional and other losses, taking into account the amplitude of swing itself.

In the case of a very substantial departure of frequency of applied force from the natural period of the body, the amplitude of swing will be very small. As the frequency of application of outside force more and more nearly approximates the natural period of the body the amplitude of swing will increase; and it is possible to plot a curve showing relationship of amplitude of swing as compared to difference between the frequency of the applied force as compared to the natural period. Such a curve will rise at a rapidly increasing rate as the departure from a condition of synchronism becomes smaller, until it reaches its highest point at the condition of perfect synchronism. It therefore follows that when the frequency of the applied force closely approximates the natural period, a relatively small change of the amount of departure from synchronism will represent a very large change of amplitude; and by making use of this principle I am able to produce devices which will operate to an extremely close regulation, since it is possible to control within a relatively small change of amplitude even when operating close to a condition of synchronism. This feature is embodied in certain of the forms of device contemplated herein.

According to certain features of the present invention, I provide devices which are so arranged that a restraining influence is automatically applied to the rotating member which supplies the external energy, said application of restraining influence being governed by the departure from a condition of synchronism, and such governing action taking place under conditions which closely approximate synchronism at the frequency of the natural period. This restraining influence thereby constantly checks or holds back the natural tendency of the applied force to become too frequent, so that the frequency of the applied force is thereby regulated under extremely favorable conditions for close regulation.

Considered from another angle, one application of the invention consists in regulating the frequency of the applied force by a modifying influence, which modifying influence becomes greater as the condition of synchronism is approached, so that the tendency to hold the frequency of the applied impulses to the natural period is a maximum and is applied under the most favorable conditions.

In those cases in which there is a natural tendency for the frequency of the applied impulses to increase I provide arrangements whereby the frequency of said applied impulses is restrained as the condition of synchronism is approached; and in those cases in which the frequency of the applied impulses tends to decrease I provide arrangements which would naturally tend to increase the frequency of said applied impulses so as to hold the same up to the natural period, and in each case the amount of the modifying influence increases as the condition of synchronism is aproached.

Now, referring to the drawings,—

Fig. 1 shows diagrammatically the relationship of amplitude of swing as compared to departure from a condition of synchronism, being merely illustrative of the fact that said amplitude increases very rapidly as the condition of synchronism is approached;

Fig. 2 shows somewhat diagrammatically a simple form of pendulum mechanism operating according to the principles herein disclosed;

Fig. 3 shows a cross section on the line 3—3 of Fig. 2, looking in the direction of the arrows;

Figure 4:
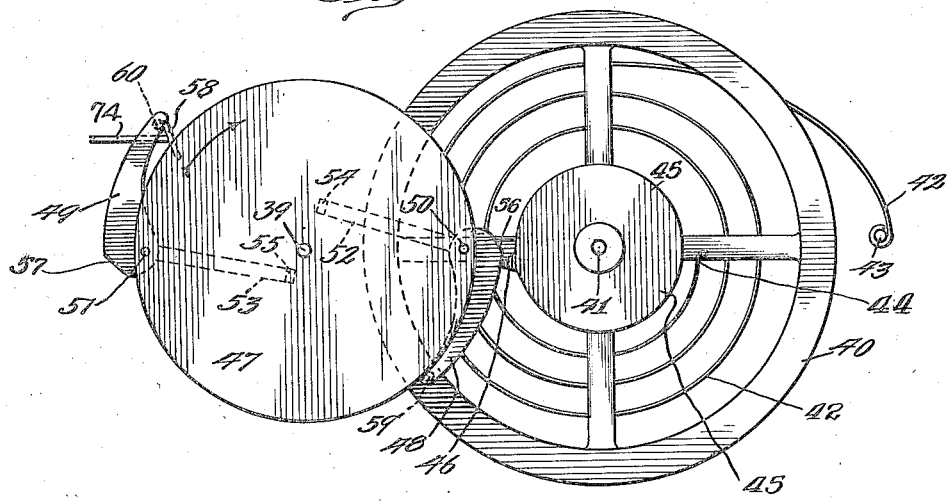
Fig. 4 shows more or less diagrammatically another form, of device also embodying the features of the present invention, being a balance wheel construction.

Referring first to Fig. 1, the amplitude of swing is shown by the vertical ordinates along the line 10, and the departure from synchronism is shown by the abscissae along the lines 11. The position 12 represents theoretical synchronism, at which point there is no departure from synchronism. Positions to the left hand of the line 12 represent a condition where the frequency of the applied impulses is less than synchronism, and positions to the right hand of the line 12 represent conditions where the frequency of the applied impulses is greater than synchronism.

The curves 13 and 14 represent the amplitude of swing of the oscillating member; and it will be noticed that as the condition of synchronism is approached said curves run up very rapidly and become a maximum at the line 12. In view of the foregoing it follows that if we select two different amounts of departure from the synchronous condition, as shown for example by the abscissae 15 and 16, the corresponding ordinate heights at 17 and 18 will represent the two amplitudes of swing; and for a given amount of distance between the abscissae 15 and 16 the difference of height between 17 and 18 will increase very rapidly as the synchronous condition is approached.

Referring next to the pendulum control construction shown in Figs. 2 and 3, in this case the rotating shaft 19 constantly tends to increase its speed and the regulating device herein disclosed serves to restrain such tendency, and such restraining influence rapidly increases as the synchronous condition is approached. A pendulum 20 having the bob 21 and the rod 22 swings on a knife edge 23. This pendulum, of course, has a definite natural period.

Eccentrically mounted upon the shaft 19 is a block 24, the central point 25 of which is off center from the axis of rotation, (see Fig. 2). At the central point 25 of the block 24 there is an outwardly extending pin 25ª upon which is journaled a block 26 (see Fig. 3 in particular). Surrounding the block 24 is a circular collar 27 of size sufficient to clear the block 24 when the two elements are concentric. A light leaf spring 28 connects the block 26 with the collar 27; and in order to prevent improper restraining influences said leaf spring preferably has its lower end connected into a small block 29 which is slidably mounted within a slot 30 in an extension 31 of the collar 27. Under these circumstances, this leaf spring 28 normally tends to retain the block 24 and collar 27 concentric, but the parts can be shifted away from concentricity, under which condition, however, the leaf spring 28 is deflected, and the amount of force necessary to cause such shifting is dependent upon the amount of deflection.

A link 32 is connected to the collar 27 and its outer end is rigidly connected to the upper end of a stem 34 which in turn is connected to the pendulum rod 22 by a leaf spring 35. A pin 33 is connected to the link 32 and stem 34 and serves to guide these parts in their movements, for which purpose the pin 33 works in a slot 33$^b$ of a stationary part 33$^a$. The parts are shown in another position by the dotted lines of Figure 2.

The collar 27 is provided with two brake shoes 36 and 37; and the collar 27 and brake shoes are of proper size to allow the block 24 to rotate with the shaft 19, and the brake shoes 36 and 37 will sufficiently clear the block 24 during such rotation as long as the parts are concentric, and also there will be no interference between the brake shoes and block collar until the collar 27 is deflected a sufficient distance in one direction of the other against the influence of the spring 28.

The operation is as follows:

Assuming the frequency of rotation of the shaft 19 to be less than the period of the pendulum, the rotations of the shaft 19 will cause the block 24 to rotate on the center 19 (see Fig. 2), and thus the collar 27 will also be rocked back and forth, the necessary force being communicated between the block 24 and said collar by means of the leaf spring 28. As the collar 27 rocks back and forth the link 32 will be drawn back and forth, and will communicate its force to the pendulum through the medium of the leaf spring 35. As long as the amplitude of swing of the pendulum is not excessive the back and forth movements of the parts will not be sufficient to cause the brake shoes 36 and 37 to come into contact with the block 24, and no restraining influence will be exerted by them on the shaft 19. Consequently, the speed of said shaft may continue to increase.

As the speed of the shaft 19 continues to increase so that it more and more nearly approximates the natural period of the pendulum, the amplitude of pendulum swing will increase, and thus the tendency of the collar 27 to be forced back and forth an excessive amount will increase until finally the brake shoes will interfere with the block 24, and thus will exert a restraining influence holding down the speed of the shaft 19. In this way the speed of said shaft can be governed to a very close amount and its speed in turn may be used to govern the speed of some other device.

The period of the pendulum may be readily adjusted in any convenient manner, as for example by adjusting its bob up and down by means of a thumb screw 38.

Figure 5:
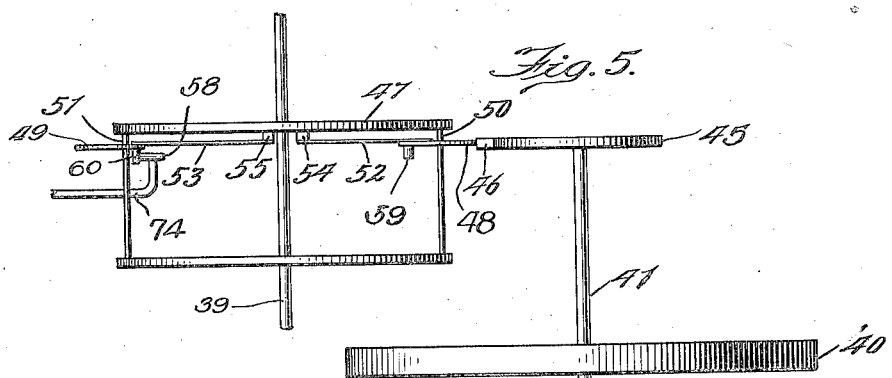
Fig. 5 shows a side view corresponding to Fig. 4.

In the construction shown in Figs. 4 and 5, the rotating shaft 39 tends to increase its speed. A balance wheel 40 oscillates back and forth with the shaft 41 and is controlled by the balance spring 42 having its outer end fixed at the point 43 and its inner end 44 connected to the shaft 41 or wheel 40, as will be well understood. This balance wheel has a definite natural period for reasonably small amplitudes of swing.

Mounted upon the shaft 41 is a disk 45 having a lug 46 which projects towards the position of the shaft 39, and said lug is so positioned that it swings back and forth with substantially equal amounts of swing to both sides of a line drawn between the shafts 39 and 41.

Mounted upon the shaft 39 is a disk 47. Pivoted to this disk are the arms 48 and 49, the same being pivoted by the pins 50 and 51. These arms have the inwardly reaching fingers 52 and 53, the inner ends of which carry the brake shoes 54 and 55, which are spring pressed against the bottom face of the disk 47. As the arms 48 and 49 are rocked back and forth toward and from the shaft 39 (see Fig. 4), the brake shoes 54 and 55 are slid back and forth on the disk 47, and thus exert a restraining influence.

The arms 48 and 49 have their outer edges so curved that when said arms are restored to the normal position said edges are concentric with the shaft 39 (such being the position of the arm 49 at the instant shown in Fig. 4). The rear edges of said concentrically curved portions of the edges terminate at the knees 56 and 57.

Mounted on the stationary bracket 74 there is a stationary fixed cam block 58 located at a convenient position, and the arms 48 and 49 are provided with studs 59 and 60 which will strike against said stationary cam 58 as the disk 47 rotates so as to swing the arms outwardy and restore them periodically to the normal positions where their outer edges lie concentric with the shaft 39.

The mode of operation is as follows:

The retardation of the constantly rotating shaft 39 is caused by the frictional force opposing the motion of the brake shoes 54 and 55. This motion is caused by the pressure of the lug 46 against the edges of the arms 48 and 49 as the lug moves downwards through the medial plane, which passes through the two shafts. The arms are restored to their normal positions with their edges concentric with the shaft 39 by reason of engagement of their studs 59 and 60 with the fixed cam block 58.

The shaft 39 makes approximately ½ of a revolution while the balance wheel makes a complete oscillation. Ordinarily the force driving the shaft 39 will be more than sufficient to keep it rotating with this velocity and will give it an acceleration. The greater this acceleration the further the arm will have moved downwardly across the medial plane, and therefore the point of impact of the lug 46 will be closer to the pivotal point of the arm. Consequently the greater the force driving the shaft 39, the greater will be the energy dissipated in moving the arms back and forth, since said arms will necessarily have to move through a greater distance. Obviously for a given maximum force driving the shaft 39 this mechanism can be designed to dissipate in friction all energy above that necessary to keep the system in motion; and for all driving forces between these two limits the velocity of the system will be determined by the natural period of oscillating system.

Figure 6:
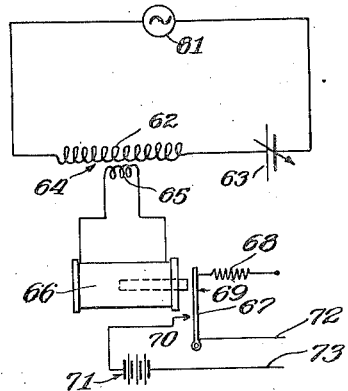
Fig. 6 shows diagrammatically an oscillating electrical circuit embodying the features of the invention.

Referring to the electric arrangement shown in Fig. 6, in this case an alternator 61 is driven by any suitable motive agent the speed of which is to be regulated. There is a tuned circuit including the inductance 62 and variable capacity 63, so that the natural frequency of said circuit can be readily adjusted or tuned. For any given adjustment the amount of current which will flow in said circut will depend upon the frequency of the impressed electromotive force from the alternator 61 as compared to the natural frequency of the circuit. As the frequency of the alternator approaches the natural frequency the volume of current flowing in the circuit will increase, and will reach a maximum when the frequency of the alternator is equal to the natural frequency of the circuit.

The inductance 62 is readily established as one coil of a transformer 64, the other coil 65, of which, is connected to the solenoid 66 of a relay. This relay includes the armature 67 which is normally retracted by a spring 68 to a position against a back stop 69. When the solenoid is sufficiently energized the armature will be drawn over against the force of the spring into contact with a stationary contact 70, thus closing a local circuit which is supplied by a battery 71. The leads 72 and 73 of this local circuit are connected to a suitable speed controlling device whereby the frequency of the alternator is held down and prevented from becoming excessive.

While I have herein shown and described only certain embodiments of the features of my present invention still I do not intend to limit myself thereto except as I may do so in the claims.

I claim:

1. The combination with a rotating shaft whose speed of rotation constantly tends to increase, of an oscillating member having a definite natural period of oscillation, a reciprocating connection between said shaft and said oscillating member, and means constituting a portion of said reciprocating connection for exercising a braking influence on the shaft when the period of reciprocation approaches the natural period of the oscillating member, substantially as described.

2. The combination with a rotating shaft whose speed tends to increase, of an oscillating member having a natural period of oscillation, an eccentric member in direct connection with said shaft, and connections intermediate said eccentric member and the oscillating member, said connections including brake mechanism for opposing the rotation of the shaft and also including means operative effectively to bring said brake mechanism into operation with excessive vibrations of the oscillating member, substantially as described.

3. The combination with a rotating shaft whose speed of rotation tends to increase, of an oscillating member having a natural period of oscillation, means for transmitting reciprocating movements from the shaft to the oscillating member, and energy dissipating means in conjunction therewith operative effectively to dissipate energy derived from the shaft when the amplitude of the oscillating member exceeds a predetermined amount less than but closely approximately the natural period of the oscillating member substantially as described.

4. The combination with a constantly moving source of energy whose rate of movement tends to increase, of means for controlling the same at a substantially definite rate comprising an oscillating member having a definite natural period of operation, an eccentric member in conjunction with the first mentioned member, and connections intermediate said parts operative effectively to check the increase of speed when the same approaches the natural period of oscillation, aforesaid, substantially as described.

5. The combination of a continuously rotating system with an oscillating system, means whereby the rotating system supplies periodic force impulses to maintain the oscillating system in oscillation, and means whereby the oscillating system operates to regulate the speed of the rotating system in accordance with the natural period of oscillation of the oscillating system, substantially as described.

6. The combination with a continuously rotating system whose speed tends to change, of an oscillating system, means for delivering energy from the rotating system to the oscillating system to maintain the oscillations of the latter, and means under control of the oscillations for limiting the change of speed of the rotating system, substantially as described.

7. A speed responsive device including a governor and a vibratory system for modifying the action of said governor.

8. In a speed control system, a prime mover, a mechanical vibratory system, means driven from said prime mover for applying driving impulses to said mechanical vibratory system, and means controlled by the phase angle difference between the natural period of vibration of said vibratory system and said driving impulses applied thereto for controlling the speed of said prime mover.

9. In a speed control system, a prime mover, a mechanical vibratory system, means driven from said prime mover for applying driving impulses to said mechanical vibratory system, and means controlled by the phase angle difference between the vibrations of said vibratory system and said driving impulses applied thereto, for controlling the speed of said prime mover.

MELVIN MOONEY.